United States Patent [19]

Blatter et al.

[11] Patent Number: 5,148,275

[45] Date of Patent: Sep. 15, 1992

[54] SECOND VIDEO PROGRAM

[75] Inventors: Harold Blatter, Indianapolis; Billy W. Beyers, Jr., Greenfield, both of Ind.

[73] Assignee: Thomson Consumer Electronics, Inc., Indianapolis, Ind.

[21] Appl. No.: 613,033

[22] Filed: Nov. 15, 1990

[51] Int. Cl.$^5$ .................. H04N 7/04; H04N 5/262; H04N 5/272

[52] U.S. Cl. ..................... 358/147; 358/183

[58] Field of Search ............... 358/146, 147, 143, 144, 358/183, 188, 22 PIP, 86

[56] References Cited

U.S. PATENT DOCUMENTS

| | | | |
|---|---|---|---|
| 4,680,629 | 7/1987 | Fukushima et al. | 358/147 |
| 4,716,589 | 12/1987 | Matsui | 358/144 |
| 4,774,582 | 9/1988 | Hakamada et al. | 358/183 |
| 4,914,516 | 4/1990 | Duffield | 358/183 |
| 5,036,394 | 7/1991 | Morii et al. | 358/146 |

FOREIGN PATENT DOCUMENTS 58-145283  8/1983  Japan ..................... 358/147

OTHER PUBLICATIONS

Shunjiro Harada, "A Still-Picture Multiplexed Television System", NHK Laboratories Note, No. 194, pp. 2-11, Feb. 1976.

Primary Examiner—James J. Groody
Assistant Examiner—Safet Metjahic
Attorney, Agent, or Firm—Joseph S. Tripoli; Peter M. Emanuel; Thomas F. Lenihan

[57] ABSTRACT

A television receiver having a video memory receives a small number of lines of a second low motion content video program transmitted during the vertical blanking interval of a first normal video program, stores and accumulates the lines of the second video program in video memory, and displays the image of the second video program when it is fully assembled. Audio for the second video program is conveyed via a second audio program (SAP) channel. In this manner two video programs, each of which is encoded in a standard television format (i.e., NTSC, PAL, or SECAM) can be received by a single tuner tuned to a single channel. In an embodiment utilizing picture-in-picture processing circuitry, the second video program can be displayed in an inset area of the screen.

13 Claims, 7 Drawing Sheets

SECOND VIDEO PROGRAM

FIELD OF THE INVENTION

The subject application concerns the field of television receivers having video memory circuitry such as found in picture-in-picture (pix-in-pix or PIP) processing circuitry for receiving and storing images of video programs.

BACKGROUND OF THE INVENTION

Many modern television receivers have picture-in-picture (pix-in-pix, or PIP) capability, that is, the capability of receiving video signals from two different sources and for combining them to produce a signal which when displayed results in a first image corresponding to a first program in a main viewing area and a second image corresponding to a second program in a secondary (inset) viewing area of the same display screen. The above-mentioned two video sources may be any of the following: two tuners, two baseband video inputs, or a tuner and a baseband video input.

PIP capability, at the present time, tends to be a "high end" feature (i.e., a feature of the more expensive end of the manufacturers line of television receivers). Such high end receivers may also include other desirable features such as multichannel television sound capability.

The broadcasting of multichannel or stereo sound programs for television in the United States is in accordance with the system adopted by the Broadcast Systems Television Committee (BTSC) of the Electronic Industries Association (EIA). This television multichannel sound system (MTS) provides for the transmission of the sum of the left and right stereo audio information (L+R) in a main audio channel in the spectrum space of the television signal formerly occupied by the monophonic audio signal (mono), and for the transmission of the difference of the left and right stereo audio information (L-R), modulated onto a subcarrier. The television multichannel system also provides for the option of simultaneously transmitting a second audio program (SAP) which typically may be used to carry a second language version of the program being provided in the main (L+R) audio channel.

Thus, although some television broadcasters transmit two distinct audio signals on the same television channel, only one video program is transmitted per standard television channel because of limited channel capacity.

SUMMARY OF THE INVENTION

In a television receiver including a decoder for second audio program (SAP) signals, and also including video signal storage capability, a second, lower resolution video program may be received a few lines at a time during the vertical blanking interval of the main video program. It is further recognized that an audio signal corresponding to the second video program can be transmitted via the SAP channel.

DETAILED DESCRIPTION OF THE EMBODIMENT

In the United States, there are television programs known in general as "home shopping service" programs, in which various items are offered for sale to viewers at home who call a displayed telephone number to order desired items. These programs are so popular that some television channels are entirely devoted to the broadcast of home shopping programs. Typically, the video content of these programs consists almost entirely of a substantially "still" picture of the item for sale, and the telephone number for ordering the item. The still picture is typically maintained on the screen for relatively long periods of time, perhaps five minutes or longer, until the next item is offered for sale.

It is herein recognized that it is unnecessary to use an entire television channel to transmit a home shopping program, or other television program having low motion content. Instead, the video image associated with the home shopping program may be sent a few lines at a time along with the video of normal relatively high motion content main television program. In this way, a broadcaster benefits because he can sell formerly unused lines of video to a promoter, thereby generating increased profit with essentially no increase of expenditure. The television receiver manufacturer also benefits because he can offer an additional feature to his customers without having to add a large amount of additional circuitry to pix-in-pix equipped receivers to implement the feature. The customer benefits because, in effect, the customer gains frequency spectrum space for an additional television channel by receiving an alternate television program transmitted on an already used channel.

In accordance with one aspect of the subject invention, a receiver having video storage capability will receive the combined signals, separate them, and store the low motion video image line-by-line in video RAM. A television picture for programs, such as home shopping programs, may be assembled over a relatively long period of time and displayed from storage, because of the extremely low motion content of the image, and because of the fact that the image is maintained for far longer than the time necessary to assemble the image in the receiver.

It is important to note that, in contrast to a teletext system, both of the video signals to be separated by the subject apparatus are encoded in accordance with the same television standard (NTSC, PAL, or SECAM) (with the exception of the vertical sync portion of the second video program signal, as will be discussed below).

In accordance with a further aspect of the subject invention, audio for the home shopping program is provided by the second audio program (SAP) portion of the transmitted television signal, as will be described in detail below.

In one embodiment of the invention, the video image for the second video program may be transmitted one line at a time during the vertical blanking interval.

In relation to an alternative embodiment, it is known that the first several lines of a television picture are not normally displayed, because they are in an area of the display screen called the vertical overscan area. Thus, a line of the second video program can be transmitted in the vertical overscan area of the main picture. In either of the above embodiments, in order to assemble a full frame of 440 visible lines, it would take 440 lines ×16.6 ms per line for a total time of 7.304 seconds. If the second video image is to be displayed by a PIP processing unit in an inset portion of the display screen, then only 80 lines need be sent, resulting in a total assembly time of 80×16.6 ms or 1.328 seconds. The reduced number of lines is possible because the height of the inset area is approximately one-third the height of the entire display area. Thus, it is unnecessary to transmit the entire second video program image, if two thirds of the lines are to be discarded by the receiver when forming the inset image.

Figure 1:
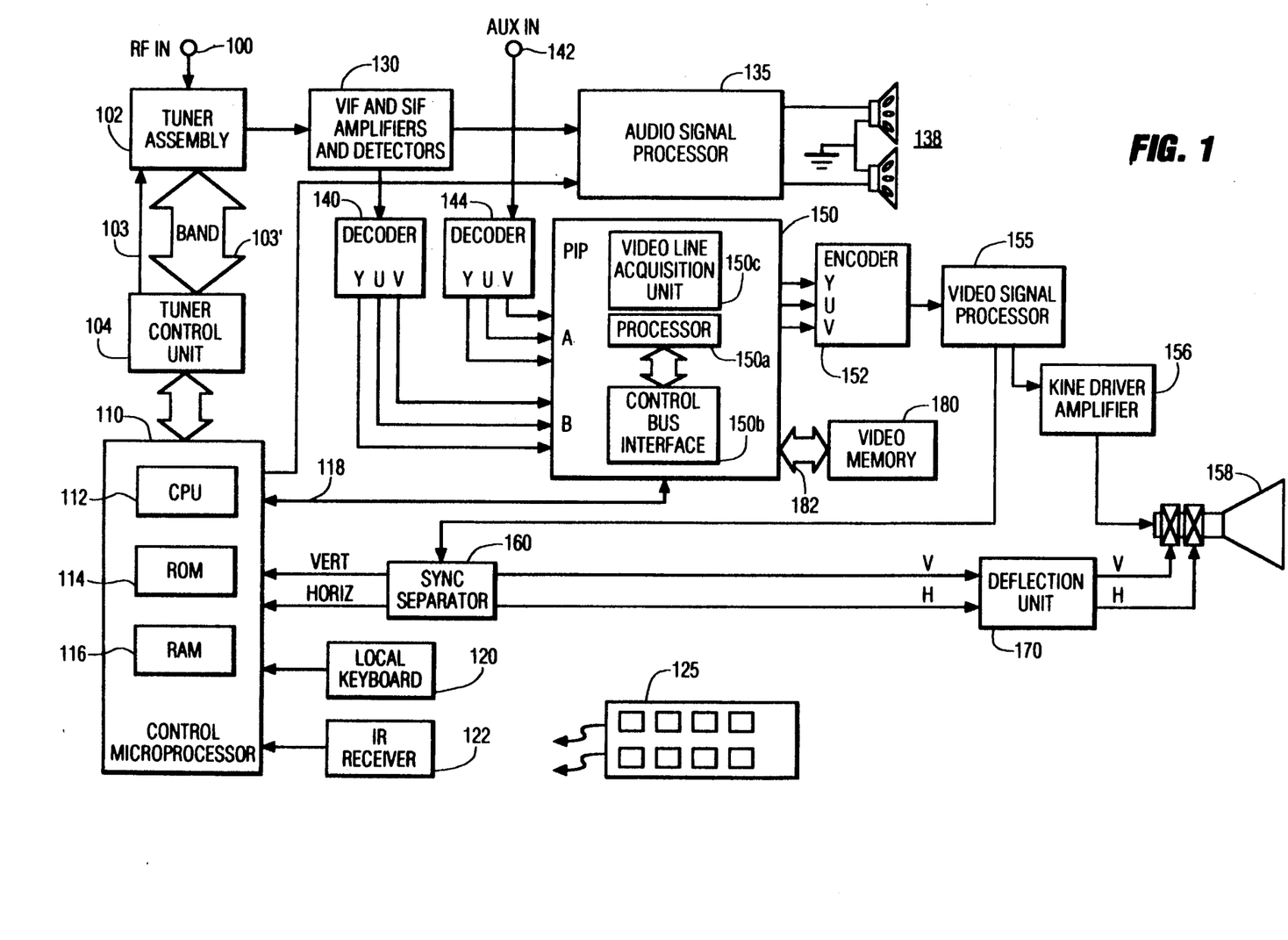
FIG. 1 shows, in block diagram form, a television receiver incorporating the subject invention.

A simplified block diagram of a preferred embodiment of the invention, in which a single line of a second video program is received during each vertical blanking interval, is shown in the FIG. 1. Referring to FIG. 1, radio frequency (RF) signals are applied to an RF input terminal 100 of a tuner assembly 102. Tuner assembly 102 selects a particular RF signal under control of a tuner control unit 104 which applies a tuning control signal to tuner assembly 102 via a wire 103, and applies bandswitching signals via a control bus 103'. Tuner control unit 104 is controlled by a controller 110. Controller 110, which may be a microprocessor or microcomputer, includes a central processing unit (CPU) 112, a read-only memory (ROM) 114, and a random access memory 116. Controller 110 receives user-entered control signals from a local keyboard 120 and from an infrared (IR) receiver 122. IR receiver 122 receives and decodes remote control signals transmitted by a remote control unit 125.

Tuner 102 produces a signal at an intermediate frequency (IF) and applies it to a processing unit 130 comprising a video IF (VIF) amplifying stage an AFT circuit, and video detector, and a sound IF (SIF) amplifying stage. Processing unit 130 produces a baseband composite video signal (TV), and a sound carrier signal. The sound carrier signal is applied to an audio signal processor unit 135 which includes an audio detector and a stereo decoder. Audio signal processor unit 135 produces baseband left and right audio signals and applies them to a pair of speakers 138 for sound reproduction.

The baseband video signal (TV) is coupled to a decoder 140 which separates luminance from chrominance, demodulates chrominance to derive U and V, and produces, at respective outputs, a luminance Y signal, and U and V color component signals. A video input terminal 142 labelled AUX IN is provided for receiving a baseband video signal from an external source. The externally supplied baseband video signal is applied to a second decoder unit 144 which also produces a luminance Y signal, and U and V color component signals. The derived Y, U, and V signals are applied to input terminals A and B of a picture-in-picture (PIP) processing unit 150, respectively.

PIP unit 150 includes a processor unit 150a for processing the applied video signals, a control bus interface unit 150b for communicating with controller 110 over a serial control bus 118, and a video line acquisition unit 150c for acquiring a specific video line during the vertical blanking interval for storage in a video RAM unit 180. It is also recognized that video line acquisition unit 150c could be external to the PIP unit 150, and coupled to controller 110 for controlling the writing of a line of video to the memory unit associated with PIP unit 150.

Processor unit 150a of PIP unit 150 monitors the received television lines of the second video program in order to detect a line containing a digital code instead of video information. The television line containing the digital code indicates the start of a new field of video for the second video program (i.e., the digital code serves as a vertical sync signal for the second video program). Upon reception of the line containing the digital code, processor unit 150a resets the internal address registers of PIP unit 150 (not shown) to begin writing subsequently received television lines of the second video program to the area of video memory unit 180 which correspond to the top of the inset image. It is important to note that the vertical sync information is not contained within the digital code. That is, reception of a line containing any digital code is treated as a vertical sync indication. Therefore, all of the possible digital codes are free for other uses, such as product-type identification codes useful for drawing the user's attention to a specific category of items previously selected by the user. In such a system, a match between a received product-type identification code (such as, watches, rings, etc.) and a code for a desired item previously entered by a user would trigger a response in the receiver to alert the user that an item in the desired category is currently being displayed. The response could be the automatic activation of the PIP mode to show the item in the inset picture. Alternatively, the response to the detection of matching codes could be the activation of an audible, or on-screen visual, indicator to alert the user.

Serial control bus 118 couples command data from controller 110 which controls PIP unit 150 to produce an image for display having a main (or primary) picture and an inset (or secondary) picture. Under controller command, via serial bus 118, the PIP function may be enabled and disabled, and the inset picture may be displayed, for example, in any of the four corners, or in several other areas of the screen. Also under controller command via serial bus 153, PIP unit 150 may be controlled to interchange (swap) the main and inset television images. It should be noted that if only 80 lines are transmitted for the inset image, that a swap of inset and main images will result in a low vertical resolution image (i.e., 80 lines rather than 240 lines) being displayed in the main viewing area of the screen.

The output Y, U, and V signals of PIP unit 150 are applied to an encoder unit 152 which converts them into a composite video signal for further processing by video signal processor unit 155 and a kine driver amplifier 156, and ultimately displayed on a display screen of a display device 158. Video signals are also applied to a sync separator unit 160 which derives vertical and horizontal synchronizing signals therefrom. The derived vertical and horizontal signals are applied to controller 110 and to a deflection unit 170 for the production of deflection signals for application to the yoke assembly of display device 158.

PIP unit 150 is coupled to video memory unit (video RAM) 180 by a data bus 182. Video RAM 180 is preferably large enough to store at least one field of a television picture (i.e., field store memory). The term field store memory as used herein means a memory capable of storing 220 television lines of data wherein each television line comprises 512 8-bit bytes of data. Video RAM 180 may also be a frame store memory, having the capability of storing two complete fields of video information, comprising at least the 440 active video lines of a full television frame of 525 lines. Controller 110 can cause PIP unit 150 to address any individual memory location of video RAM 180, by sending the appropriate command over serial control bus 118.

Figure 3:
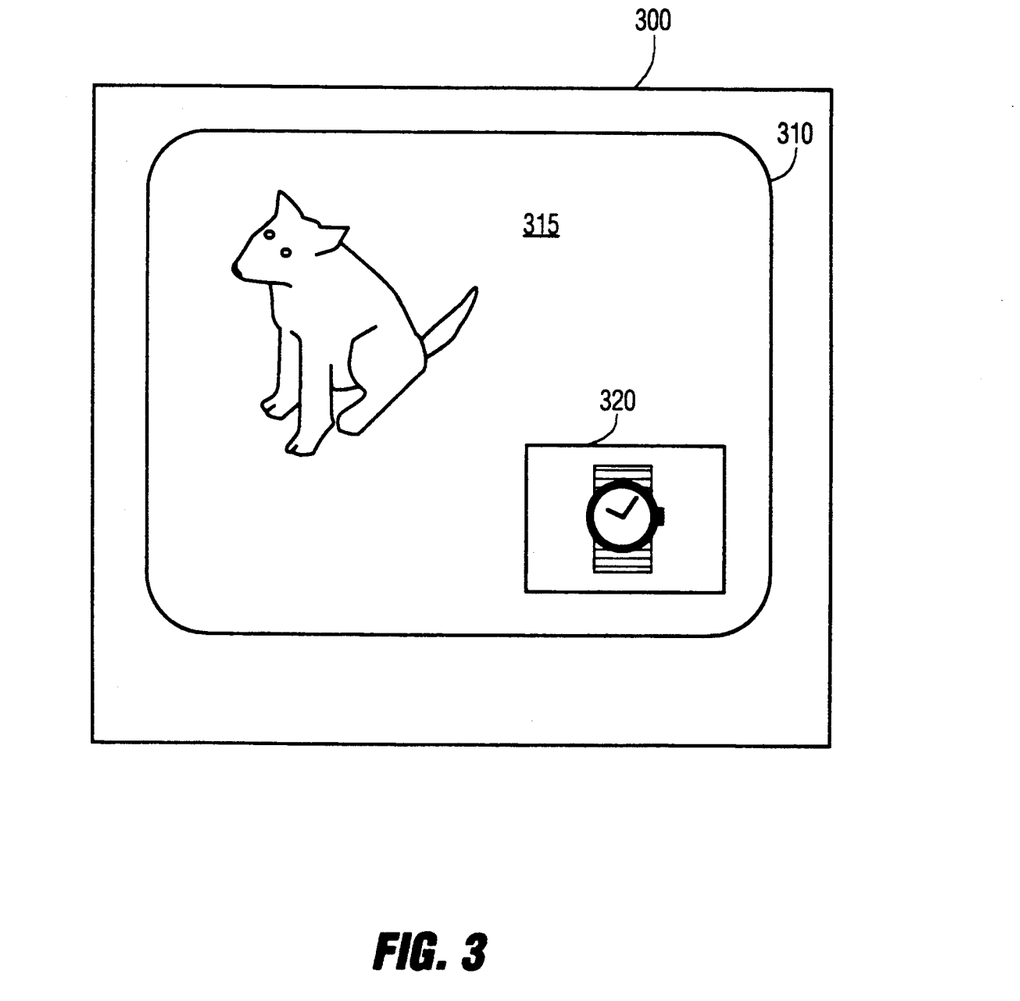
FIG. 3 and 4 show television displays suitable for use with the subject invention.

Referring to FIG. 3, a television receiver 300 having PIX-IN-PIX capability includes a display screen 310 having a major portion 315 and a minor, or inset, portion 320. The video signal reproduced on the major portion 315 of display screen 310 is normal television picture image which conventional television receivers would receive and process. The video signal displayed in inset 320 is the image produced by accumulating in video memory 180 a predetermined number of video lines of a second video program transmitted one line at a time during the vertical interval of the main signal displayed in screen portion 315. The vertical height of inset area 320 is typically about one-third that of the main screen. The main screen can display roughly 240 lines per field for a total of about 480 lines per frame. The number of lines in the inset is 80 lines per field, or 160 lines per frame. Therefore, at a transmission rate of one line per field of the main television signal, only 80×16.67 ms. (or 1.33 seconds) is required to reconstruct one field of the image for the second video program. If two otherwise unused TV lines of the main picture signal (for example, TV lines 16 and 20, which occur during the vertical blanking interval of the main signal) are used to send second video program information, then the image reconstruction time is reduced to 666.8 ms. It should also be noted that the width of inset area 320 is approximately one-fourth of the width of the main viewing area 315. Therefore, an inset horizontal line contains only one-fourth the video information that a full horizontal line contains. Thus, in one horizontal line-time of the main picture, there is enough of an interval to send 4 inset horizontal lines, one after the other. In this way, the second video program image reconstruction time would be further reduced by a factor of 4 to 166.7 ms.

Figure 4:
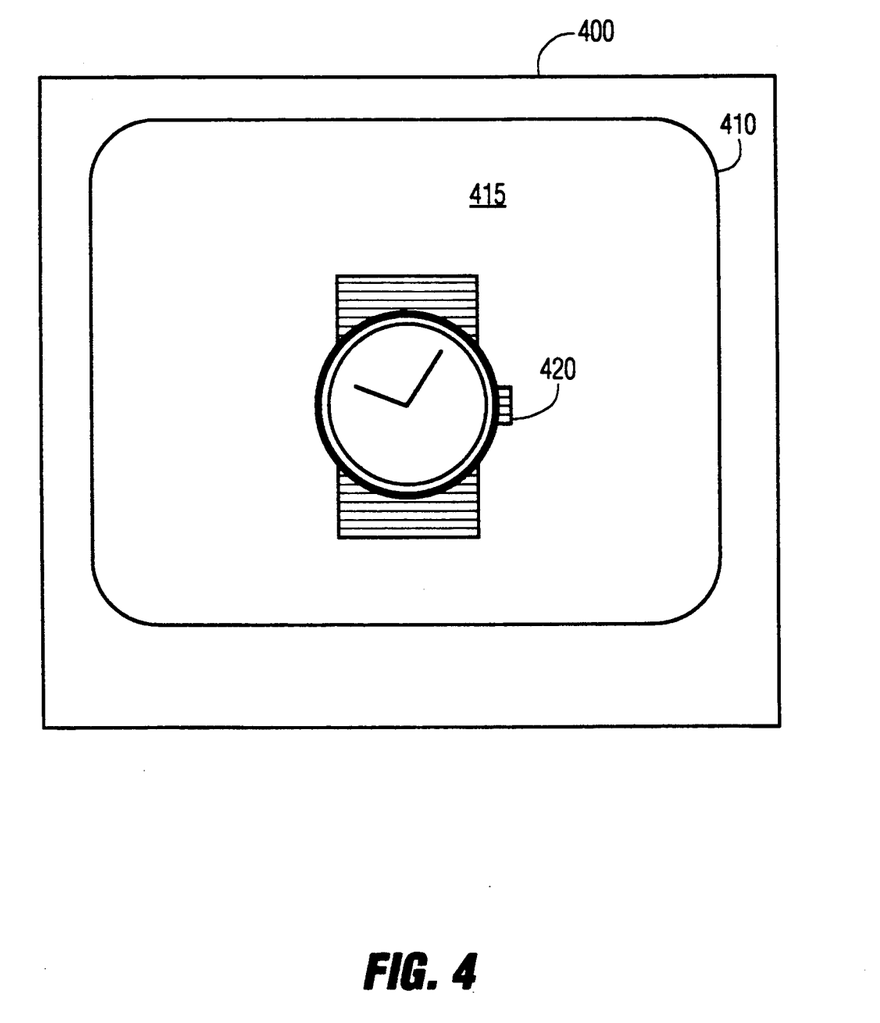

In the alternative, a full size image 420 could be transmitted and assembled for the second video program, as shown in FIG. 4. With a one line transfer per field of the main picture signal, such an image would have an image assembly time of 240 lines ×16.67 ms for a total time of about 4 seconds per field or 8 seconds per frame. Of course, a two line transfer per field would reduce the assembly time to 2 seconds per field, or 4 seconds per frame. While this full screen embodiment of the invention takes considerably longer to assemble the second video program images, the images are of much higher resolution than is possible when the previously described inset image embodiment is used.

Figure 5:
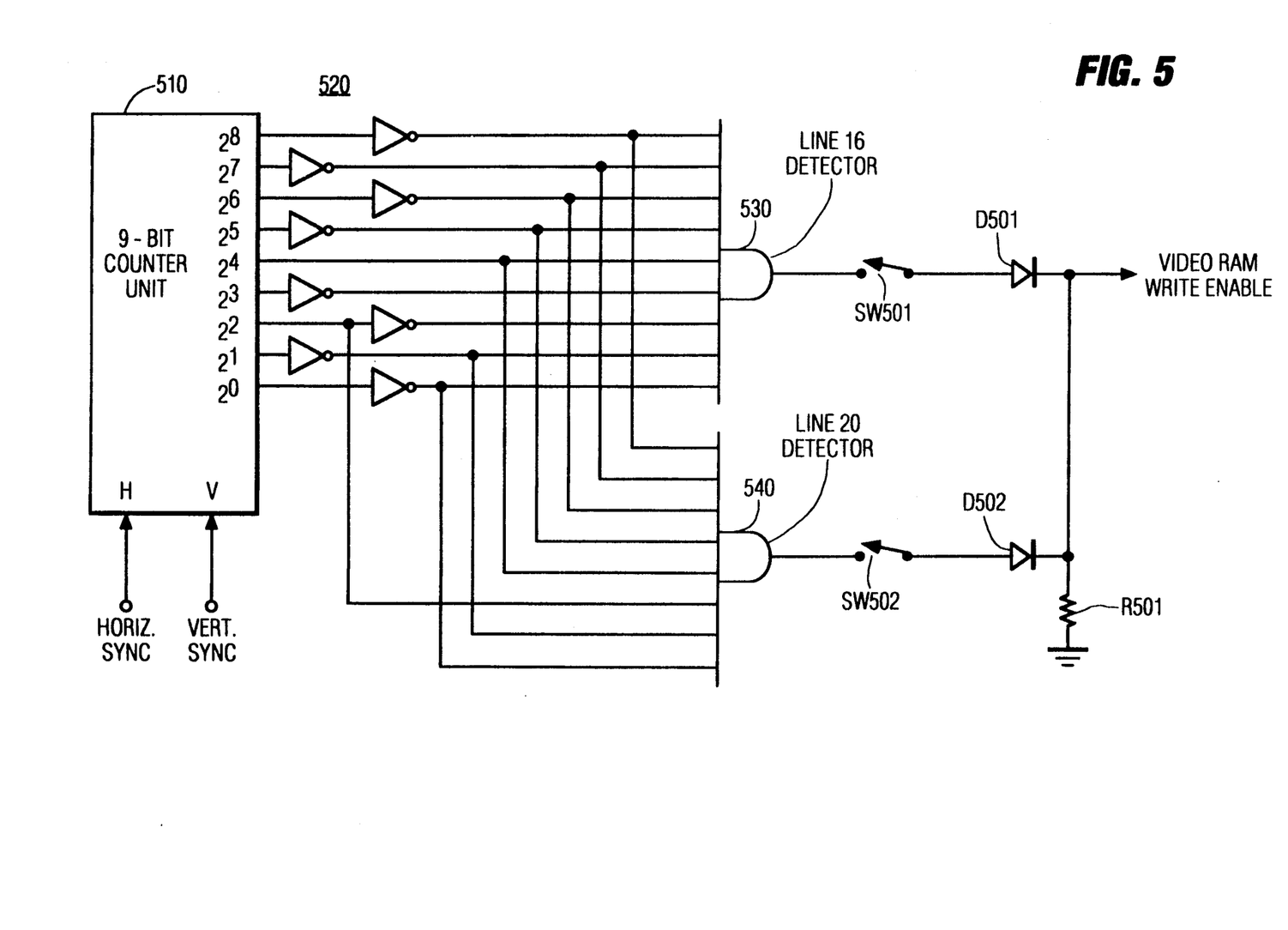
FIGS. 5 and 6 show detailed embodiments of the video line acquisition unit of FIG. 1.
Figure 6:
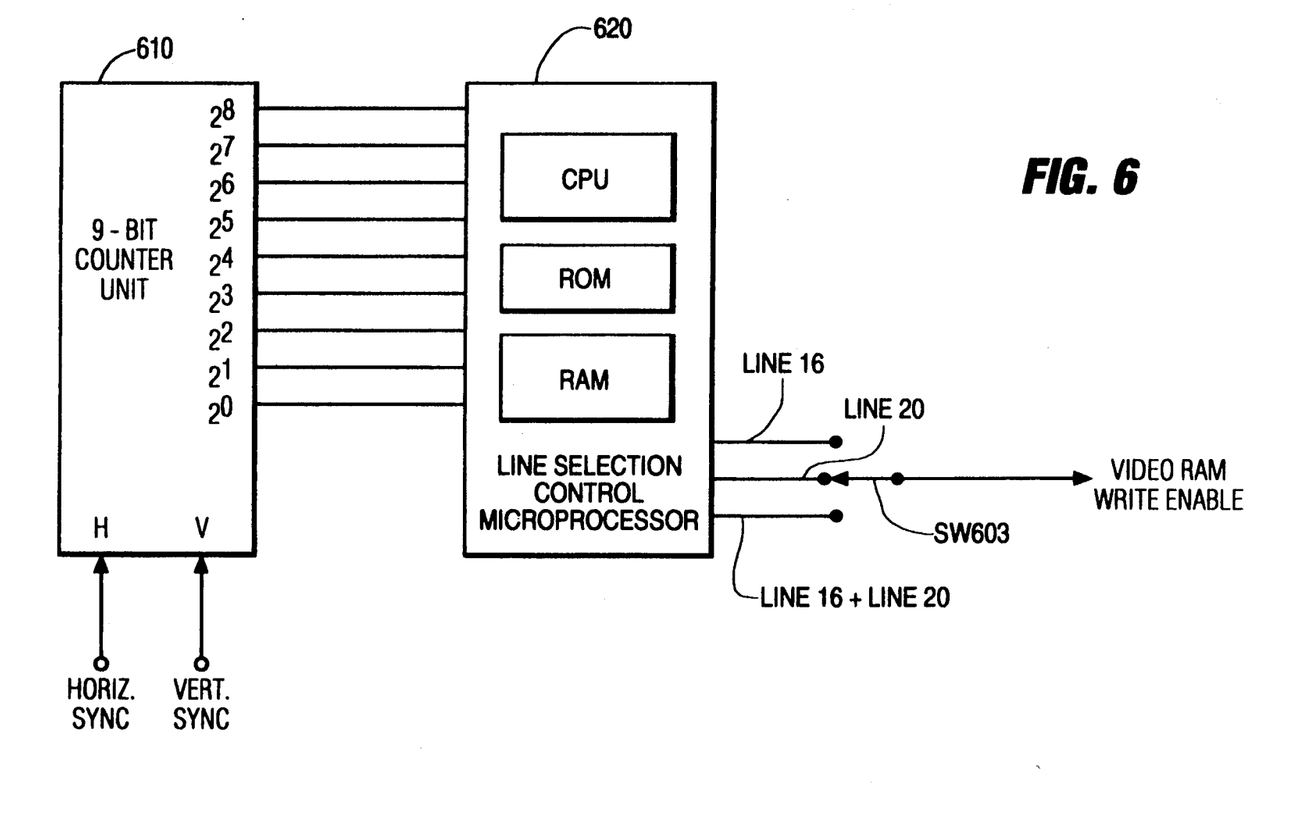

Two embodiments of video line acquisition unit 150c of FIG. 1 are shown in FIGS. 5 and 6, respectively. Referring first to FIG. 5, a 9-bit binary counter unit 510 counts horizontal sync pulses, and is reset in response to vertical sync pulses. In the NTSC system there are 262½ lines per field. Thus, counter unit 510, having a maximum count of 511, never overflows. The binary signals representing the count of counter 510 are applied via an inverter arrangement, generally designated 520, to an AND gate 530 arranged to detect the occurrence of the 16th horizontal sync pulse after the vertical sync pulse, and thus serve as a line 16 detector, and to another AND gate 540 arranged as a line 20 detector. The outputs of detectors 530 and 540 are selectively coupled via switches SW501 and SW502 and isolation diodes D501 and D502 to an output at which a VIDEO RAM WRITE ENABLE signal is developed across a resistor R501. The VIDEO RAM WRITE ENABLE signal is "true" (i.e., at at high logic level) for the entire time of television line 16, television line 20, or both, according to the settings of switches SW501 and SW502. Switches SW501 and SW502 are set by the user. The settings of switches SW501 and SW502 are determined by whether second video program information is sent by the transmitting television station on line 16, line 20, or both. The VIDEO RAM WRITE ENABLE signal allows the acquisition and storage of the video signal associated with each of the respective selected lines. It is noted in passing that television lines 17, 18, and 19 are occupied by broadcast television test signals, and are thus not available for second video program transmission.

A second embodiment of video line acquisition unit 150c is shown in FIG. 6. A 9-bit counter 610 serves the same purpose as 9-bit counter 510 of FIG. 5. The output signals of counter unit 610 are applied to a controller 620, which may be a microprocessor, microcomputer, or a custom dedicated integrated circuit. In response to the count at its input terminals, controller 620 selectively produces signals coincident with line 16, line 20, or both. A switch SW603 (or simply a jumper wire) selects the desired output of controller 620 to be the above-mentioned VIDEO RAM WRITE ENABLE signal.

Figure 2:
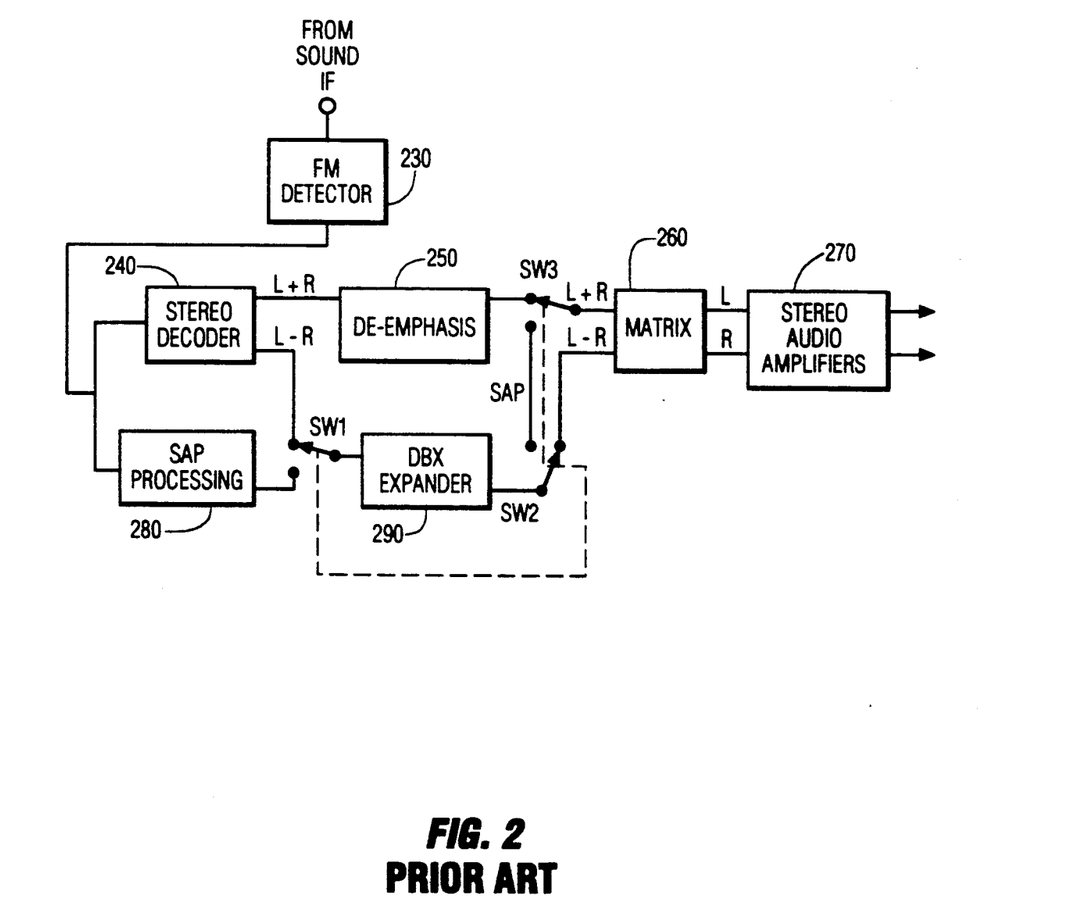
FIG. 2 shows, in block diagram form, a dbx expander as known from the prior art.

As noted above, the audio information for the second video program is provided via the second audio program (SAP) channel. FIG. 2 shows a portion of a television receiver, as known from the prior art, having BTSC multichannel television sound (MTS) capability. In FIG. 2, switches SW1, SW2, and SW3 have a first position for selecting stereo audio signals, and a second position for selecting SAP audio signals. The dotted lines through switches SW1, SW2, and SW3 indicate that they are "ganged together" (i.e., coupled together for simultaneous operation). Switches SW1, SW2, and SW3, are shown in the stereo signal selection position. The BTSC multichannel television sound (MTS) system referred to above includes a dbx noise reduction system which provides wideband and spectral compression of the audio signal before transmission. Because the FM stereo signals are received in a compressed form, the circuitry of FIG. 2 includes a dbx expander unit 290 for reconstructing the original audio signal.

Specifically relating to FIG. 2, the audio signals produced by signal processing unit 130 of FIG. 1 are detected in an FM detector 230 and applied to a stereo decoder 240. Stereo decoder 240 provides an L+R stereo sum signal and an L-R stereo difference signal. The stereo sum signal is deemphasized in a deemphasis unit 250 (i.e., a low pass filter) and applied, via switch SW3, as one input to a stereo matrixing unit 260 in which the original left (L) and right (R) stereo signals are reconstructed. The L-R stereo difference signal from stereo decoder unit 240 is applied via switch SW1 to dbx expander unit 290. The expanded L-R stereo difference signal is applied to the other input of stereo matrix unit 260 via switch SW2. The reconstructed left (L) and right (R) stereo signals are applied to stereo audio amplifier unit 270 for amplification and ultimate reproduction in dual speaker unit 138 of FIG. 1.

The detected audio signal is also applied to a second audio program (SAP) processing unit 280. If the second audio program is desired, switches SWl, SW2, and SW3 are switched to the opposite position. Changing the positions of switches SW2 and SW3 disconnects the stereo signals from matrix unit 260, and causes the SAP signal to be applied to the L+R input of matrix unit 260. The dbx expander can be shared in this way because one never listens to stereo audio and the SAP channel at the same time.

Figure 7:
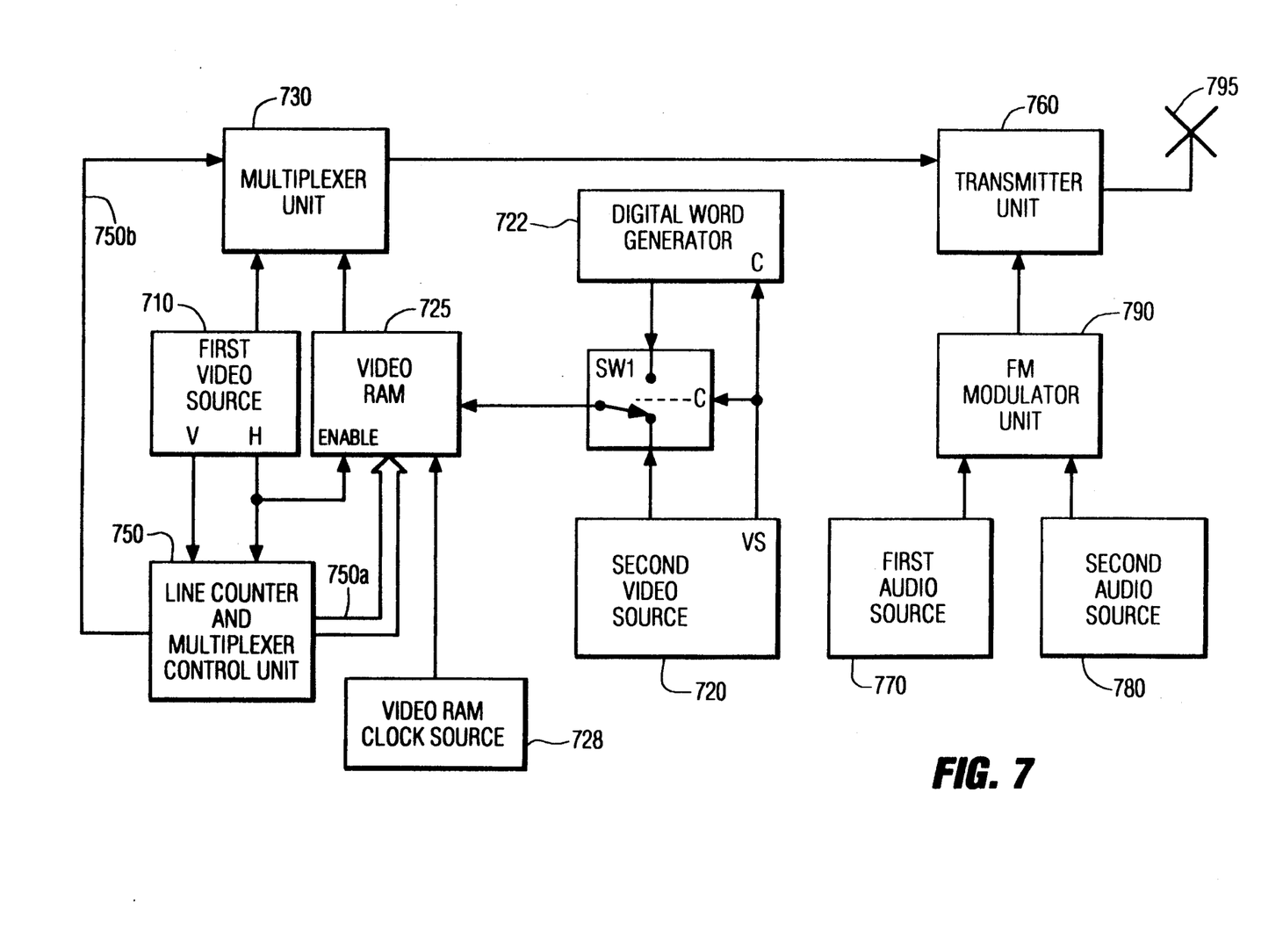
FIG. 7 shows in block diagram form a transmission encoding arrangement suitable for generating the television signal to be decoded in the receiver shown in FIG. 1.

FIG. 7 is a block diagram of a broadcast system suitable for producing the television signal which is decoded in the television receiver of FIG. 1 for reproducing video and audio corresponding to the main and second programs. A multiplexer unit 730 receives signals from a first video source 710 and from a VIDEO RAM 725 written into by a second video source 720, and produces an output signal which is a combination of all but one line of the signal from the first video source and only one line from the second video source. Video source 710 and the enable input of VIDEO RAM 725 are driven with a common horizontal sync signal so that their respective horizontal line-times begin simultaneously. Line selection and timing is controlled by a line counter and multiplexer control unit 750 (which may include a microprocessor) in response to horizontal and vertical sync signals associated with the video signal of the first video source. The selection of a video line from VIDEO RAM 725 is controlled by a signal developed on a television line address bus 750a. The addresses on television line address bus 750a are incremented after each line is inserted into the combined signal. The insertion of the selected line into the combined signal by multiplexer unit 730 is controlled via line 750b.

Audio signals from a first audio source 770, associated with first video source 710, and a second audio source 780, associated with second video source 720, are applied to respective inputs of an FM modulator 790. The audio signal from first audio source 770 is modulated onto the main sound carrier of the television signal, and the audio signal from second audio source 780 is modulated onto the second audio program (SAP) carrier. The output signal of FM modulator 790 and the output signal from multiplexer unit 730 are applied to respective input terminals of a transmitter unit 760 for modulation onto a specific television carrier. The amplified output signal of transmitter unit 760 is applied to an antenna 795 for broadcast.

While FIG. 7 has been described with reference to a broadcast system, the subject invention is also applicable to cable television stations.

One skilled in the art will realize that various data compression techniques can be used to convey more information in less time. For example, it is known to transmit auxiliary video information, such as side-panel information of a widescreen television system, by encoding the information into the NTSC signal. U.S. Pat. No. 4,855,811 entitled, APPARATUS FOR PROCESSING AUXILIARY INFORMATION IN AN EXTENDED DEFINITION WIDESCREEN TELEVISION SYSTEM (Isnardi), describes such a system. In a system according to Isnardi, auxiliary side-panel low frequency signals are time-compressed in the horizontal overscan region. Side-panel high frequency signals modulate one phase of an auxiliary subcarrier. Extra horizontal luminance high frequency information modulates a quadrature phase of the auxiliary subcarrier. A so-called "helper" signal quadrature modulates the RF picture carrier. It is herein recognized that second video program information, rather than side-panel information, could be encoded in this fashion.

A method of encoding a television signal with a digital signal is known from U.S. patent application Ser. No. 252,223 entitled DIGITAL SIGNAL ENCODING AND DECODING APPARATUS (Adelson) filed Sep. 30, 1988, and allowed Mar. 13, 1990 and now issued as U.S. Pat. No. 4,939,515. In a system according to Adelson, a digital data signal is conveyed along with the analog signal by selectively quantizing the analog signal according to one of two quantizing functions in response to the level of each of the digital bits to be sent. By determining which quantization function was used, a decoder can recover the encoded digital data. Stated another way, if a pixel can be represented by two different analog signal levels which are perceptually indistinguishable from each other by a viewer, then a binary zero value can be assigned to one of the analog signal levels, and a binary one value can be assigned to the other. When the analog signal is received, it can be examined on a pixel by pixel basis to see which of the perceptually indistinguishable analog signal levels it exhibits. Reception of one of the analog signal levels implies the transmission of a binary one, reception of the other one of the analog signal levels implies the transmission of a binary zero. It is herein recognized that the system of Adelson could be used to transmit the low motion image of the second video program on a one bit per pixel basis.

The term television receiver, as used herein, includes television receivers having a display device (commonly known as television sets) and television receivers without a display device, such as VCRs.

What is claimed is:

1. A television receiver, comprising:
   tuner means for receiving RF signals, said tuner means selecting a particular RF signal from a plurality of RF signals in response to a control signal;
   control means for generating said control signal for causing said tuner means to select said particular RF signal;
   video processing means coupled to said tuner means for receiving said selected RF signal and producing a first baseband video signal for a first television program therefrom, said first baseband video signal being encoded in a standard television format and having a portion containing a predetermined amount of a second baseband video signal, said predetermined amount of said second baseband signal also being encoded in a standard television format;
   picture-in-picture processing means coupled to said video processing means for receiving said first baseband video signal, and for producing a signal which when displayed on a display means produces an image containing an inset picture area within a main picture area;
   means for selecting said predetermined amount of said second baseband video signal from said first baseband video signal including a video line acquisition means comprising a counter means and a line detector means;
   memory means for storing and accumulating data representative of recurring ones of said predetermined amount of said second baseband video signal to form an image of a second video program;
   means for reading said data representing said second video program image from said memory means for display within one of said main picture area and said inset area; and means for detecting, and processing audio signals, corresponding to a second audio program, said second audio program being associated with said second video program.

2. The television receiver of claim 1, wherein said portion of said first baseband video signal containing a predetermined amount of said second baseband video signal is the vertical blanking interval of said first baseband video signal.

3. The television receiver of claim 2, wherein a plurality of video lines of said vertical blanking interval are subject to contain said predetermined amount of said second baseband video signal.

4. The television receiver of claim 1 wherein said plurality of video lines containing said predetermined amount of said second baseband video signal is two.

5. The television receiver of claim 4 wherein said predetermined amount of said second baseband video signal occupies television line 16.

6. The television receiver of claim 4 wherein said predetermined amount of said second baseband video signal occupies television line 20.

7. The television receiver of claim 4 wherein said predetermined amount of said second baseband video signal occupies television lines 16 and 20.

8. A television receiver, comprising:
tuner means for receiving RF signals, said tuner means selecting a particular RF signal from a plurality of RF signals in response to a control signal;
control means for generating said control signal for causing said tuner means to select said particular RF signal;
video processing means coupled to said tuner means for receiving said selected RF signal and producing a first baseband video signal for a first television program therefrom, said first baseband video signal having a portion subject to contain a predetermined amount of a second baseband video signal;
picture-in-picture processing means coupled to said video processing means for receiving said first baseband video signal, and for producing a signal which when displayed on a display means produces an image containing an inset picture area within a main picture area;
means including decoding means for selecting said predetermined amount of said second baseband video signal from said first baseband video signal;
memory means storing and accumulating data representative of recurring ones of said predetermined amount of said second baseband video signal to form an image of a second video program;
means for reading said data representing said second video program image from said memory means for display in one of said maim picture area and said inset picture area; and
means for detecting, and processing audio signals, corresponding to a second audio program, said second audio program being associated with said second video program.

9. The television receiver of claim 8, wherein said portion of said first baseband video signal being subject to contain a predetermined amount of said second baseband video signal is the vertical blanking interval of said first baseband video signal.

10. The television receiver of claim 9, wherein a plurality of video lines of said vertical blanking interval are subject to contain said predetermined amount of said second baseband video signal.

11. The television receiver of claim 10 wherein said plurality of video lines subject to contain said predetermined amount of said second baseband video signal is two.

12. The television receiver of claim 11 wherein said predetermined amount of said second baseband video signal occupies television line 16.

13. The television receiver of claim 11 wherein said predetermined amount of said second baseband video signal occupies television line 20.

* * * * *